(12) United States Patent
Kuboki

(10) Patent No.: US 12,395,240 B2
(45) Date of Patent: Aug. 19, 2025

(54) OPTICAL COMMUNICATION SYSTEM, FAILURE ANALYSIS APPARATUS, AND FAILURE ANALYSIS METHOD OF OPTICAL COMMUNICATION SYSTEM

(71) Applicant: NEC Corporation, Tokyo (JP)

(72) Inventor: Shingo Kuboki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 428 days.

(21) Appl. No.: 17/908,643

(22) PCT Filed: Mar. 27, 2020

(86) PCT No.: PCT/JP2020/014405
§ 371 (c)(1),
(2) Date: Sep. 1, 2022

(87) PCT Pub. No.: WO2021/192316
PCT Pub. Date: Sep. 30, 2021

(65) Prior Publication Data
US 2023/0101899 A1    Mar. 30, 2023

(51) Int. Cl.
*H04B 10/07*  (2013.01)
*H04B 10/079* (2013.01)
*H04Q 11/00*  (2006.01)

(52) U.S. Cl.
CPC ......... *H04B 10/0791* (2013.01); *H04B 10/07* (2013.01); *H04B 10/0793* (2013.01); *H04Q 2011/0083* (2013.01)

(58) Field of Classification Search
CPC  H04B 10/0791; H04B 10/0793; H04B 10/07; H04J 14/0227; H04Q 2011/0083
(Continued)

(56) References Cited

U.S. PATENT DOCUMENTS 6,598,184 B1 *  7/2003  Merget ................. H04L 41/142
                                                      709/224
9,077,478 B1 *  7/2015  Schmidtke .......... H04J 14/0257
(Continued)

FOREIGN PATENT DOCUMENTS

JP    H05-260049 A    10/1993
JP    2009-223362 A   10/2009
(Continued)

OTHER PUBLICATIONS

International Search Report for PCT Application No. PCT/JP2020/014405, mailed on Jun. 23, 2020.

*Primary Examiner* — Dibson J Sanchez

(57) ABSTRACT

An object is to estimate a location where a communication failure occurs while reducing a load on an apparatus included in an upper layer in an optical communication system. Terminal stations communicate via an optical transmission line constituting an optical network and include one or more transponders. Failure cause estimation apparatuses monitors states of the transponders provided in each of the terminal stations and estimates a failure probability for each location where an occurrence of a failure is suspected. A failure analysis apparatus estimates a location where there is a risk of failure occurrence and a failure probability at the location where there is the risk of failure occurrence based on failure cause estimation results of the failure cause estimation apparatuses provided in the terminal stations.

17 Claims, 7 Drawing Sheets

(58) Field of Classification Search
USPC .......................................................... 398/9–38
See application file for complete search history.

(56) References Cited

U.S. PATENT DOCUMENTS

| | | | | |
|---|---|---|---|---|
| 2001/0050802 | A1* | 12/2001 | Namiki ................... | H01S 3/302 |
| | | | | 359/337.11 |
| 2003/0210908 | A1* | 11/2003 | Levy .................. | H04B 10/0793 |
| | | | | 398/33 |
| 2010/0150551 | A1* | 6/2010 | Yamahara ........... | H04J 14/0206 |
| | | | | 398/83 |
| 2011/0126041 | A1* | 5/2011 | Matsubara .............. | H04L 45/28 |
| | | | | 714/E11.073 |
| 2013/0121683 | A1* | 5/2013 | Nagamine ........... | H04L 41/0677 |
| | | | | 398/2 |
| 2014/0161437 | A1* | 6/2014 | Miyabe ................ | H04B 10/032 |
| | | | | 398/5 |
| 2015/0131988 | A1* | 5/2015 | Alfiad ................. | G01M 11/088 |
| | | | | 398/28 |
| 2018/0006717 | A1* | 1/2018 | Okano ............... | H04B 10/0791 |
| 2019/0377625 | A1* | 12/2019 | Chintalapati ............ | G06N 7/01 |
| 2020/0112489 | A1* | 4/2020 | Scherger ................. | H04L 41/12 |
| 2021/0013963 | A1* | 1/2021 | Kuwabara .......... | H04B 10/0791 |
| 2022/0021449 | A1* | 1/2022 | Kawahara .......... | H04B 10/0793 |

FOREIGN PATENT DOCUMENTS

| | | | |
|---|---|---|---|
| JP | 2009-253475 | A | 10/2009 |
| JP | 2013-141122 | A | 7/2013 |
| JP | 2018-064160 | A | 4/2018 |

\* cited by examiner

OPTICAL COMMUNICATION SYSTEM, FAILURE ANALYSIS APPARATUS, AND FAILURE ANALYSIS METHOD OF OPTICAL COMMUNICATION SYSTEM

This application is a National Stage Entry of PCT/JP2020/014405 filed on Mar. 27, 2020, the contents of all of which are incorporated herein by reference, in their entirety.

TECHNICAL FIELD

The present invention relates to an optical communication system, a failure probability estimation apparatus, a failure analysis apparatus, and a failure analysis method of the optical communication system.

BACKGROUND ART

The optical communication system that transmits an optical signal through an optical fiber housed in an optical fiber cable has been widely used. In such an optical communication system, a transponder transmitting and receiving optical signals is disposed in a terminal station. The transponder communicates the optical signals with a transponder of communication destination through an optical transmission apparatus having a multiplexing/demultiplexing function of the optical signals, which serves as an interface between the transponder and the optical fiber cable.

In such an optical communication system, a communication failure between the transponders may occur, when a failure occurs in the transponders, in the optical transmission line between the transponders, in an optical amplifier and an optical add/drop apparatus inserted into the optical transmission line, or in other devices. Thus, various methods have been proposed for specifying the failure that is the cause of the communication failure when the communication failure occurs.

As an example of such a technique, a configuration in which a failure location specifying apparatus is disposed in an optical communication network has been proposed to specify where a failure occurs in a lower layer when a communication failure is detected in an upper layer in the optical communication network (PTL1). In this method, the lower-layer devices are classified into component units. The failure location specifying apparatus converts failure detection in the upper layer into one or a plurality of kinds of parameters for each component of the lower layer and estimates a component in which a failure has occurred by using the converted parameters. This facilitates the identification of the component that has failed.

CITATION LIST

Patent Literature

[PTL1] Japanese Unexamined Patent Application Publication No. 2018-64160

SUMMARY OF INVENTION

Technical Problem

However, recently, traffic data becomes enormous in optical communication network systems. Therefore, when the failure analysis is performed only by the failure analysis apparatus provided in the upper layer of the optical communication network system, such as the failure location specifying apparatus described above, a large amount of data is transmitted from the apparatus in the lower layer to the apparatus in the upper layer for use in the failure analysis. As a result, there is a possibility that the processing load of the failure analysis apparatus and the memory load required for holding the transmission data become excessive.

Further, when selection of the transmission data or data compression such as rounding is performed in order to reduce transfer data, the quality of data used for the failure analysis is deteriorated, which leads to the deterioration of accuracy and reliability of the failure analysis.

Further, when a failure occurs in the optical communication network system, although there is only one location where the failure actually occurs, alarms are issued from the failure location and a plurality of locations around the failure location, and as a result, it becomes difficult to specify the failure location and the time required for the specification becomes long. When it is difficult to identify the failure location, not only the actual failure location but also all the parts and devices at the location where the failure is suspected are replaced. Therefore, parts and devices that are not originally required to be replaced are also replaced, resulting in an increase in restoration cost.

The present invention has been made in view of the above circumstances, and an object of the present invention is to estimate a location where a communication failure occurs while reducing a load on an apparatus included in an upper layer in an optical communication system.

Other challenges and novel features will become apparent from the description and accompanying drawings.

Solution to Problem

An aspect of the present invention is an optical communication system including: an optical transmission line constituting an optical network; a plurality of terminal stations including one or more transponders and configured to communicate via the optical transmission line; failure probability estimation apparatuses respectively configured to monitor a state of the one or more transponders provided in each of the plurality of terminal stations and to estimate a failure probability for each location where an occurrence of a failure is suspected; a failure analysis apparatus configured to estimate a location where there is a risk of failure occurrence and a failure probability at the location where there is the risk of failure occurrence based on failure probability estimation results of the failure probability estimation apparatuses provided in the plurality of terminal stations.

An aspect of the present invention is a failure probability estimation apparatus configured to monitor a state of one or more transponders provided in each of a plurality of terminal stations that communicate via an optical transmission line that constitutes an optical network, and estimate a failure probability for each location where an occurrence of a failure is suspected, and to output a failure probability estimation result to a failure analysis apparatus that estimates a location where there is a risk of failure occurrence and a failure probability at the location where there is the risk of failure occurrence based on the failure probability estimation results of the plurality of terminal stations.

An aspect of the present invention is a failure analysis apparatus configured to monitor a state of one or more transponders provided in each of a plurality of terminal stations communicating through an optical transmission line constituting an optical network and to estimate a location where there is a risk of failure occurrence and a failure probability at the location where there is the risk of failure occurrence based on a failure probability estimation result of output from a failure probability estimation apparatus that estimates a failure probability at each location an occurrence of a failure is suspected.

An aspect of the present invention is a failure analysis method of optical communication system including: monitoring a state of one or more transponders provided in each of a plurality of terminal stations that communicate via an optical transmission line that constitutes an optical network, and estimate a failure probability for each location where an occurrence of a failure is suspected; and estimating a location where there is a risk of failure occurrence and a failure probability at the location where there is the risk of failure occurrence based on failure probability estimation results of the failure probability estimation apparatuses.

Advantageous Effects of Invention

According to the present invention, in an optical communication system, it is possible to estimate a location where a communication failure occurs while reducing a load on an apparatus included in an upper layer in an optical communication system.

EXAMPLE EMBODIMENT

Figure 1:
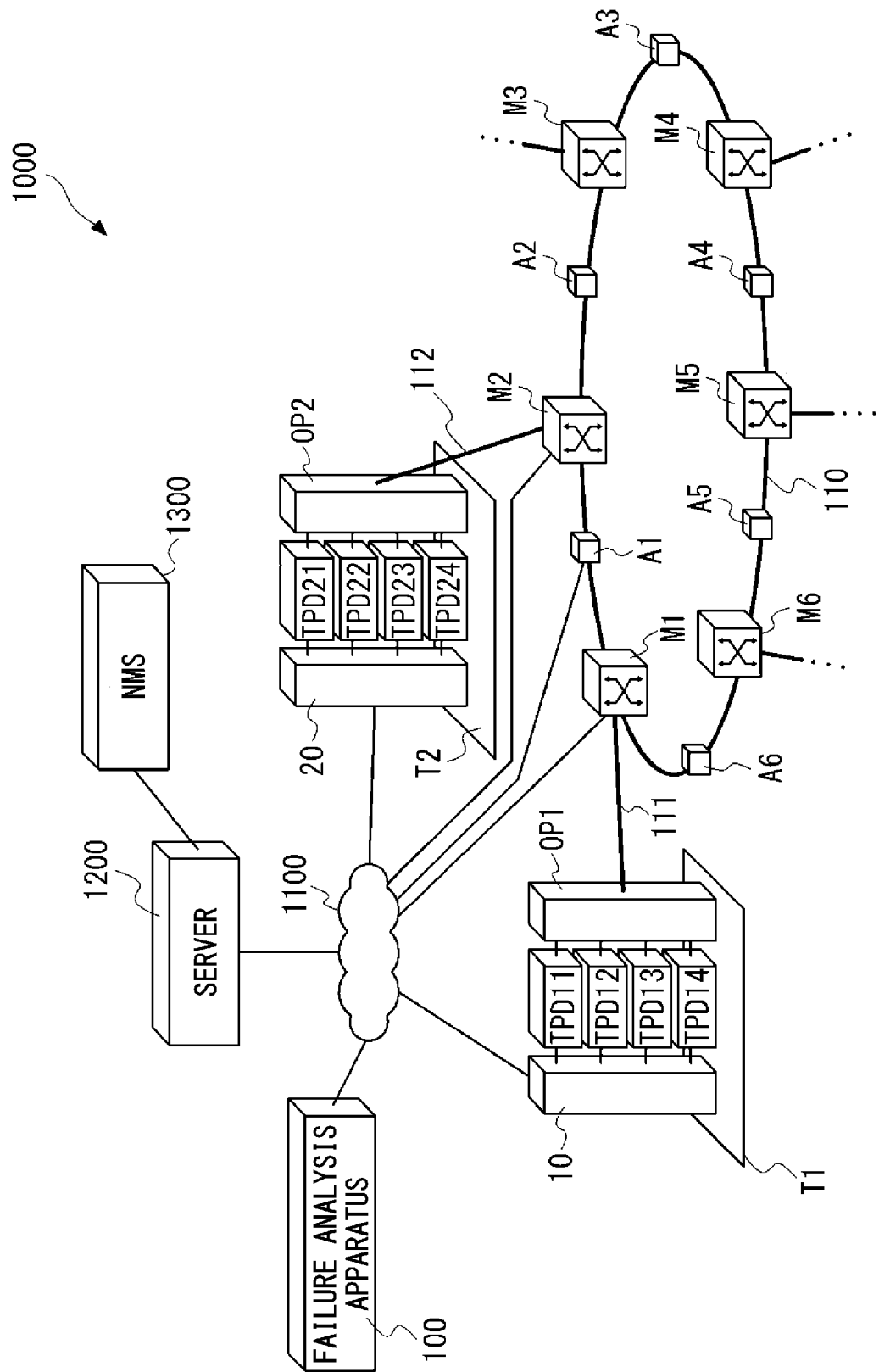
FIG. 1 is a diagram schematically showing a configuration of an optical communication system according to a first example embodiment.

Example embodiments of the present invention will be described below with reference to the drawings. In the drawings, the same elements are denoted by the same reference numerals, and thus a repeated description is omitted as needed.

First Example Embodiment

An optical communication system 1000 according to a first example embodiment will be described. The optical communication system 1000 is configured as a ring-type optical network into which a ROADM (Reconfigurable Optical Add/Drop Multiplexer) is inserted. FIG. 1 schematically shows a configuration of the optical communication system 1000 according to the first example embodiment. The optical communication system 1000 is configured as a submarine optical network system that mediates communication between terminal stations installed on land, for example.

The optical communication system 1000 includes an optical transmission line 110, optical add/drop apparatuses (ROADMs) M1 to M6, optical amplifiers A1 to A6, terminal stations T1 and T2, a failure analysis apparatus 100, a network 1100, a server 1200, and a network management system (NMS) 1300.

The server 1200 is configured to be provided in an upper layer with respect to the terminal stations T1 and T2. The server 1200 is connected to the terminal stations T1 and T2, the optical add/drop apparatuses (ROADMs) M1 to M6, the optical amplifiers A1 to A6, or the other components via the network 1100, and thereby bidirectional data communication is possible between them. The server 1200 is connected to the NMS 1300 and is capable of bidirectional data communication with the NMS 1300.

The NMS 1300 is provided in a layer upper than the server 1200. The NMS 1300 is configured as network control means capable of grasping the state of each terminal station and controlling its operation by communicating with each terminal station via the network 1100. The network control means is not limited to an independent structure such as an NMS and may be configured as an SDN (Software Defined Network) controller set on the cloud, for example.

The failure analysis apparatus 100 can perform bidirectional data communication with the terminal stations T1 and T2 via the network 1100 and estimates a failure location in the optical communication system 1000 on the basis of failure cause estimation results received from the terminal stations T1 and T2, as described below.

The optical transmission line 110 includes, for example, a ring-shaped optical cable composed of one or more optical cables each having one or more optical fibers.

The optical add/drop apparatuses (ROADMs) M1 to M6 are inserted into the optical transmission line 110. In this example, the optical add/drop apparatuses M1 to M6 are sequentially inserted in the ring formed by the optical transmission line 110 in the clockwise direction. Each of the optical add/drop apparatuses M1 to M6 is configured to branch (drop) an optical signal transmitted by the optical transmission line 110 and to insert (add) an optical signal output from another terminal station or the like into the optical transmission line 110. The insertion and branching of the optical signals performed by the optical add/drop apparatuses M1 to M6 are realized by, for example, a wavelength selective switch (WSS).

Further, the optical amplifiers A1 to A6 are inserted between adjacent two of the optical add/drop apparatuses M1 to M6. In this example, the optical amplifiers A1 to A6 are inserted in the ring formed by the optical transmission line 110 in the clockwise direction with respect to the optical add/drop apparatuses M1 to M6. The optical amplifiers A1 to A6 amplify the optical signal transmitted by the optical transmission line 110. The optical amplifiers A1 to A6 may be mounted, for example, in various devices such as optical repeaters.

Note that a part or all of the optical add/drop apparatuses and the optical amplifiers may be connected to other devices in the upper layer via the network 1100, and the connected optical add/drop apparatuses or the connected optical amplifiers may notify the other devices in the upper layer of their respective states, for example, the presence or absence of a failure, via the network 1100. In this configuration, the optical add/drop apparatuses M1 to M6 and the optical amplifiers A1 to A6 are connected to the server 1200 via the network 1100. In FIG. 1, only the connections between the server 1200, the optical add/drop apparatuses M1 and M2, and the optical amplifier A1 are shown for simplification of the drawing. The server 1200 transfers the information received from the optical add/drop apparatuses M1 to M6 and the optical amplifiers A1 to A6 to the failure analysis apparatus 100. The failure analysis apparatus 100 estimates the failure location in the optical communication network based on the transferred information.

The terminal stations T1 and T2 are configured to include an apparatus which performs data communication with an apparatus of the upper layer via the network 1100 and performs communication by the optical signal with another terminal station or the like via the optical transmission line 110. In this example, the terminal stations T1 and T2 are, for example, landing stations of a submarine cable, and are connected to the server 1200 via the network 1100, and bidirectional data communication is possible.

The terminal stations T1 and T2 are connected to any one of optical add/drop apparatuses inserted into the optical transmission line 110. In this example, the terminal station T1 is connected to the optical add/drop apparatus M1 via an optical transmission line 111. The terminal station T2 is connected to the optical add/drop apparatus M2 via an optical transmission line 112.

The terminal station T1 has an optical transmission apparatus OP1, a failure cause estimation apparatus 10, and transponders 11 to 14. The transponders 11 to 14 convert, for example, transmission data signals received via an interface unit (not shown) into optical signals and outputs the optical signals to the optical transmission apparatus OP1. For example, the optical transmission apparatus OP1 multiplexes (e.g., with a wavelength multiplexing scheme) the optical signals received from the transponders 11 to 14 and outputs the multiplexed optical signal to the optical transmission line 111. Further, the optical transmission apparatus OP1 demultiplexer the multiplexed (e.g., wavelength-multiplexed) optical signal received from the optical transmission line 111 and distributes the demultiplexed optical signals to the transponders 11 to 14. The transponders 11 to 14 convert the received optical signals into data signals and outputs them through the network 1100.

The failure cause estimation apparatus 10 estimates a failure cause by collecting information from each of the transponders 11 to 14. Then, the estimation result is output to the failure analysis apparatus 100 of the upper layer.

The failure cause estimation apparatus 10 can collect information such as the voltage, current and temperature of a power supply and components inside the transponder, the quality of the optical signal to be transmitted and received, an alarm from a framer, and a waveform of the received signal from the transponders 11 to 14.

The failure cause estimation apparatus 10 holds, for example, information indicating allowable ranges of parameters related to information collected from the transponders in a state where no failure has occurred. When a communication failure occurs, the parameters are acquired and compared with the allowable ranges to identify the parameters within the allowable ranges and the parameters outside the allowable range. A failure location and a failure probability corresponding to the acquired parameter can be estimated by preparing textbook data showing a correlation between the distribution pattern of the parameter and the failure probability of each location in advance and matching the obtained distribution pattern of the parameter or evaluating the similarity to the textbook data. This textbook data can be generated using various techniques including machine learning based on the operational performance of the optical communication system 1000 and a system similar thereto.

By monitoring the voltage, the current and temperature of the power supply and components inside the transponder, a failure probability of the transponder itself can be estimated. If the voltage, current, and temperature of the power supply and components inside the transponder are within the specified allowable ranges, the failure probability of the transponder may be estimated to be either no or low, and the failure probability of the transponder may be estimated to be high as they deviate from the allowable ranges.

By monitoring the quality of the transmitted optical signal and the waveform of the received optical signal, it is possible to estimate where the failure occurs. For example, if the quality of the optical signal to be transmitted is within the allowable range and the waveform of the optical signal to be received is outside the allowable range, it can be estimated that the failure has occurred in either the transponder of the other party of the communication or the optical transmission line. If the quality of the optical signal to be transmitted is outside the allowable range and the waveform of the optical signal to be received is within the allowable range, it can be estimated that the failure has occurred in the transponder to be monitored.

Such a failure probability may be estimated even when the communication failure occurs due to a failure at any location or when no failure occurs at any location. For example, even if the parameter for the monitored information is within the allowable range and it is not recognized that the failure has occurred, the failure probability may be estimated low if the value is near the center of the allowable range, and the failure probability may be estimated high if the value is at the end of the allowable range. Thus, by continuously or periodically updating the failure probability in the case where no failure has occurred, it is possible to prepare in advance an estimation of the cause of failure according to the latest situation of the optical communication system 1000. Thus, even when the communication failure occurs at any point in time, an estimation result of probability of the failure relating to the communication failure can be quickly provided to the upper layer.

Further, by continuously or periodically updating the failure probability in the case where no failure has occurred, it is possible to extract a location with a high failure probability and predict a location where there is a risk of failure occurrence in the future while monitoring the latest state of the optical communication system 1000. As a result, it is possible to take preventive measures such as intensively monitoring places where a failure is likely to occur in advance and replacing parts before the failure occurs.

The terminal station T2 has the same configuration as that of the terminal station T1. That is, an optical transmission apparatus OP2, a failure cause estimation apparatus 20, and transponders 21 to 24 correspond to the optical transmission apparatus OP1, the failure cause estimation apparatus 10, and the transponders 11 to 14 of the terminal station T1, respectively.

Next, a failure analysis of the optical communication system 1000 will be described with reference to two examples. The following two examples are examples of communication failures when the transponder 11 of the terminal station T1 and the transponder 23 of the terminal station T2 communicate.

Figure 2:
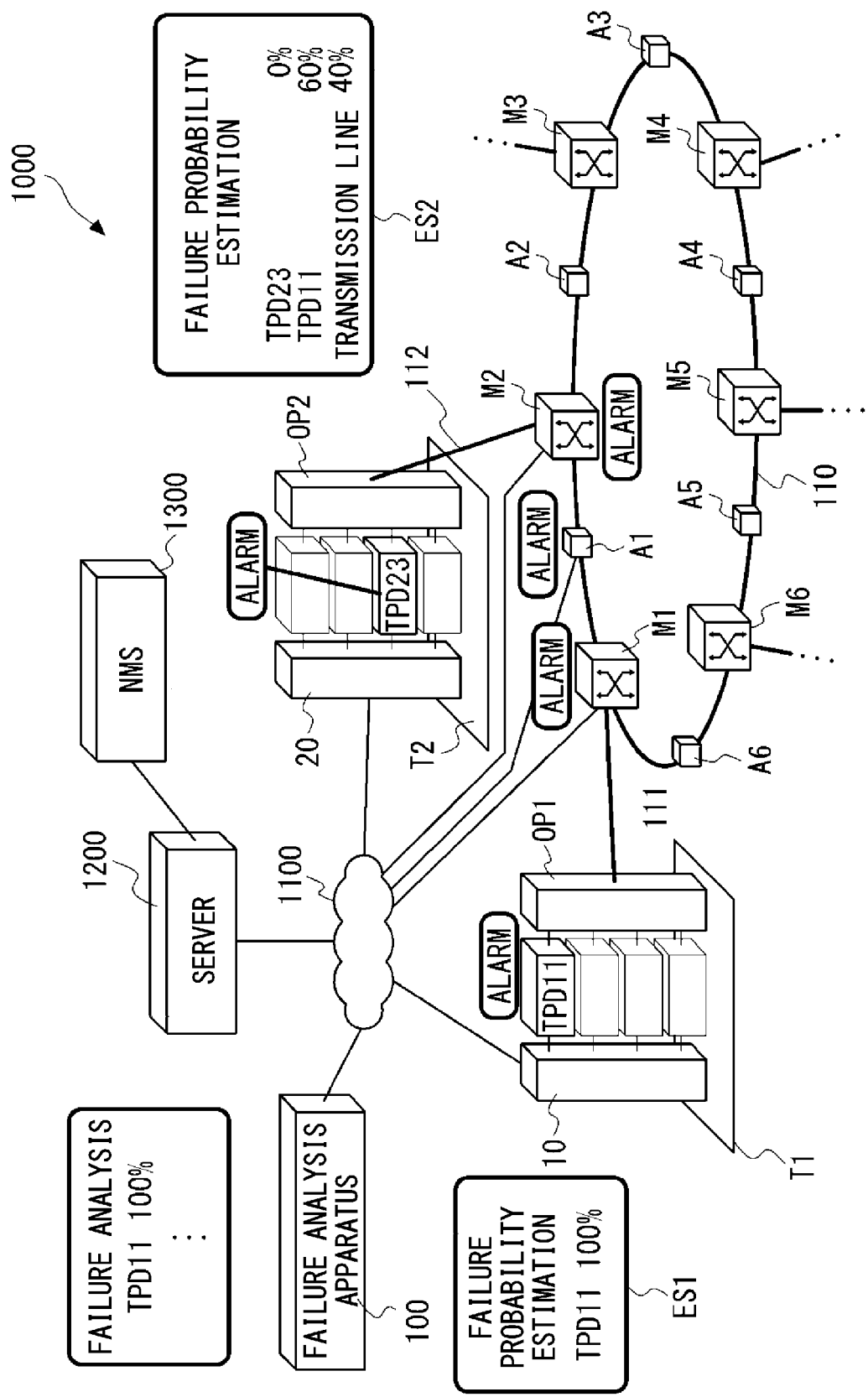
FIG. 2 is a diagram showing a first example of a communication failure in the optical communication system according to the first example embodiment.

FIG. 2 shows a first example of the communication failure in the optical communication system 1000 according to the first example embodiment. In the first example, the communication failure occurs between the transponder 11 on a transmitting side and the transponder 23 on a receiving side, and the optical amplifier A1 and the optical add/drop apparatuses M1 and M2 are issuing alarms. In this case, it is assumed that a failure occurs somewhere in the transponder 11, the transponder 23, and a transmission line connecting them. Based on this assumption, the failure cause estimation apparatus 10 of the terminal station T1 and the failure cause estimation apparatus 20 of the terminal station T2 estimate the failure cause.

The failure cause estimation apparatus 10 estimates a type of the failure causing the communication failure and a contribution ratio to the communication failure when assuming that the communication failure occurs between the transponder 11 and the transponder 23. In this example, the failure cause estimation apparatus 10 estimates that the communication failure is caused by the transponder 11 and that its contribution rate is 100%. Hereinafter, the failure cause estimation result of the failure cause estimation apparatus 10 is referred to as ES1.

Similar to the failure cause estimation apparatus 10, the failure cause estimation apparatus 20 estimates a type of a failure causing a communication failure and a contribution ratio to the communication failure when assuming that the communication failure occurs between the transponder 11 and the transponder 23. In this example, the failure cause estimation apparatus 20 estimates that the communication failure is caused by the other party of the communication (that is, the transponder 11) and the transmission line between the transponder 11 and the transponder 23. The failure cause estimation apparatus 20 estimates that the contribution ratio of the transponder 11 is 60% and that of the transmission line is 40%. Hereinafter, the failure cause estimation result of the failure cause estimation apparatus 20 is referred to as ES2.

The failure cause estimation apparatuses 10 and 20 may estimate the failure cause in advance in a state where no communication failure occurs, according to the configuration and characteristics of each transponder and transmission line.

Further, the failure cause estimation apparatuses 10 and 20 may monitor the characteristics such as power and a waveform of the optical signal output from each transponder and characteristics such as power and a waveform of the optical signal received by each transponder, respectively, and may update the failure cause estimation result appropriately. For example, when the signal quality of the received optical signal deteriorates, it is possible to estimate that there is the failure cause that can cause the communication failure in the other party of the communication or in the transmission line, and that the contribution rate of the failure cause is high. Further, when the signal quality of the optical signal to be transmitted deteriorates, it is possible to estimate that there is the failure cause that can cause the communication failure in the transponder installed in the same terminal station, and that the contribution ratio of the failure cause is high. In this way, by monitoring the transmission and reception of the optical signal of each transponder and updating the failure cause estimation result, it is possible to provide the failure cause estimation result more conforming to the present state if the communication failure occurs.

When the communication failure on a communication path to be monitored, that is, the communication failure between the transponder 11 and the transponder 23 occurs, the failure cause estimation apparatus 10 and the failure cause estimation apparatus 20 transmit the failure cause estimation results ES1 and ES2 to the failure analysis apparatus 100 via the network 1100 and the server 1200, respectively.

The failure cause estimation apparatuses 10 and 20 may autonomously detect the communication failure by monitoring the communication between the transponder 11 and the transponder 23 and transmit the failure cause estimation results ES1 and ES2.

Since the optical add/drop apparatuses M1 and M2 and the optical amplifier A1 are inserted into the transmission line between the transponder 11 and the transponder 23, it is also possible for the optical add/drop apparatuses M1 and M2 and the optical amplifier A1 to detect the communication failure and issue an alarm. In this case, the failure cause estimation apparatuses 10 and 20 may detect an alarm and transmit the failure cause estimation results ES1 and ES2. The optical add/drop apparatuses M1 and M2 and the optical amplifier A1 may notify the failure analysis apparatus 100 of the alarm. In this case, the failure analysis apparatus 100 receiving the alarm may request the failure cause estimation apparatuses 10 and 20 to transmit the failure cause estimation results ES1 and ES2.

Next, the failure analysis by the failure analysis apparatus 100 will be described. The failure analysis apparatus 100 receives the failure cause estimation results ES1 and ES2 from the failure cause estimation apparatuses 10 and 20, respectively. The failure analysis apparatus 100 specifies the failure that is a cause of the communication failure based on the failure cause estimation results ES1 and ES2. In this example, since the contribution ratio of the failure of the transponder 11 is 100% in the failure cause estimation result ES1, the failure analysis apparatus 100 analyzes that the failure of the transponder 11 is the cause of the communication failure.

The failure analysis apparatus 100 provides the analysis results to the user of the optical communication system 1000 as needed. The failure analysis apparatus 100 may transmit the analysis result through the network 1100 or may display the analysis result on a display device (not shown) or other devices.

Thus, the user can restore the communication by taking necessary measures to eliminate the communication failure, for example, by repairing or replacing the transponder 11.

Figure 3:
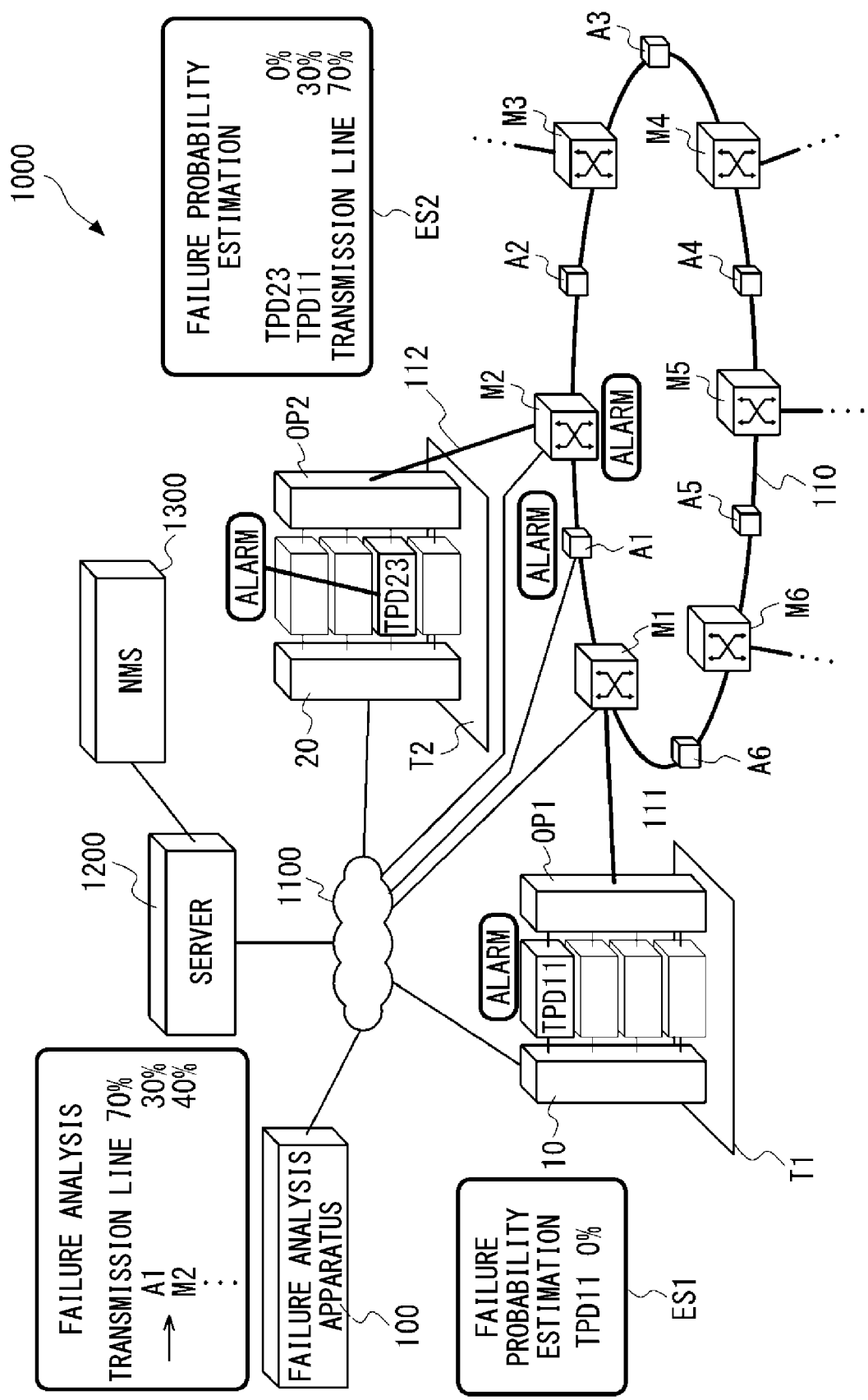
FIG. 3 is a diagram showing a second example of the communication failure in the optical communication system according to the first example embodiment.

Next, FIG. 3 shows a second example of a communication failure in the optical communication system 1000 according to the first example embodiment. In the second example, a communication failure occurs between the transponder 11 on the transmitting side and the transponder 23 on the receiving side, and the optical amplifier A1 and the optical add/drop apparatus M2 are issuing alarms. In this case, it is assumed that a failure occurs somewhere in the transponder 23 and the transmission line between the transponder 23 and the optical amplifier A1. Based on this assumption, the failure cause estimation apparatuses 10 and 20 estimate the failure cause.

From the above assumption, it is assumed that the transponder 11 does not fail because the optical add/drop apparatus M1 does not issue the alarm. Therefore, the failure cause estimation apparatus 10 estimates that the cause of the communication failure does not exist in the transponder 11 and estimates the contribution rate of that to be 0%.

Since it is assumed that the transponder 23 has not failed, the failure cause estimation apparatus 20 estimates the contribution ratio of that to be 0%. In addition, assuming that the reliability of the transponder 11 is relatively high, the failure cause estimation apparatus 20 estimates the failure probability of the transponder 11 to be 30% and the failure probability of the transmission line to be 70%.

Similar to the first example, the failure analysis apparatus 100 specifies the failure that is the cause of the communication failure based on the failure cause estimation results ES1 and ES2. In this example, based on the failure probability indicated by the failure cause estimation result ES1, the failure probability of the transponder 11 is determined to be 30% and the failure probability of the transmission line is determined to be 70%.

The failure analysis apparatus 100 can also analyze the breakdown of the failure probability of the transmission line between the transponder 11 and the transponder 23. The failure analysis apparatus 100 has information indicating the configuration of the optical communication system 1000, and can specify the components inserted in the transmission line between the transponder 11 and the transponder 23, that is, the optical amplifier A1, the optical add/drop apparatuses M1 and M2, based on the information.

Among them, since the optical add/drop apparatus M1 does not issue the alarm, it is estimated that the optical amplifier A1 and the optical add/drop apparatus M2 are likely to fail. Based on the information indicating the configuration of the optical communication system 1000, the failure analysis apparatus 100 can analyze the breakdown in which the failure probability of the optical transmission line is 70%, the failure probability of the optical amplifier A1 is 30%, and the failure probability of the optical add/drop apparatus M2 is 40%, for example.

Similar to the first example, the failure analysis apparatus 100 provides the analysis results to the user of the optical communication system 1000 as needed, so that the user can take necessary measures to eliminate the communication failure.

Specifically, the user can check the states of the transponder 11, the optical amplifier A1, and the optical add/drop apparatus M2, eliminate the failure, and restore the communication.

At this time, the failure analysis apparatus 100 may output information for recovering the failure location associated with each estimated failure location. The failure analysis apparatus 100 can, for example, hold information for recovering the failure location as a data table associated with each location where an occurrence of the failure is suspected, and can output the failure location and the recovery information in association with each other by referring to the data table as needed.

As described above, according to the present configuration, by providing the failure cause estimation apparatus on the side of the transponder instead of the external failure analysis apparatus 100, the failure cause estimation apparatus can estimate the failure probability in the transponder and the transmission line connected to the transponder, and provide the estimated result to the failure analysis apparatus 100. As a result, the failure analysis apparatus 100 can accurately estimate the failure location based on the failure cause estimation result, and can repair or replace only the failure location that requires failure elimination.

In particular, by having the failure cause estimation apparatus estimate the failure probability in the transponder and the transmission line connected to the transponder without having the failure analysis apparatus estimate the failure probability, processing load of the failure analysis apparatus and memory for holding data can be reduced.

Further, since the failure cause estimation apparatus can be distributed and arranged in various places in the optical communication system 1000, it is also possible to efficiently suppress an increase in the processing load of the failure analysis apparatus and an increase in the memory for holding data even when the scale of the optical communication system 1000 is large.

Second Example Embodiment

An optical communication system according to a second example embodiment will be described. In the optical communication system 1000 according to the first example embodiment, the failure cause estimation apparatus for collecting information from the transponder is provided independently. However, the location where the failure cause estimation apparatus is provided is not limited to this.

Figure 4:
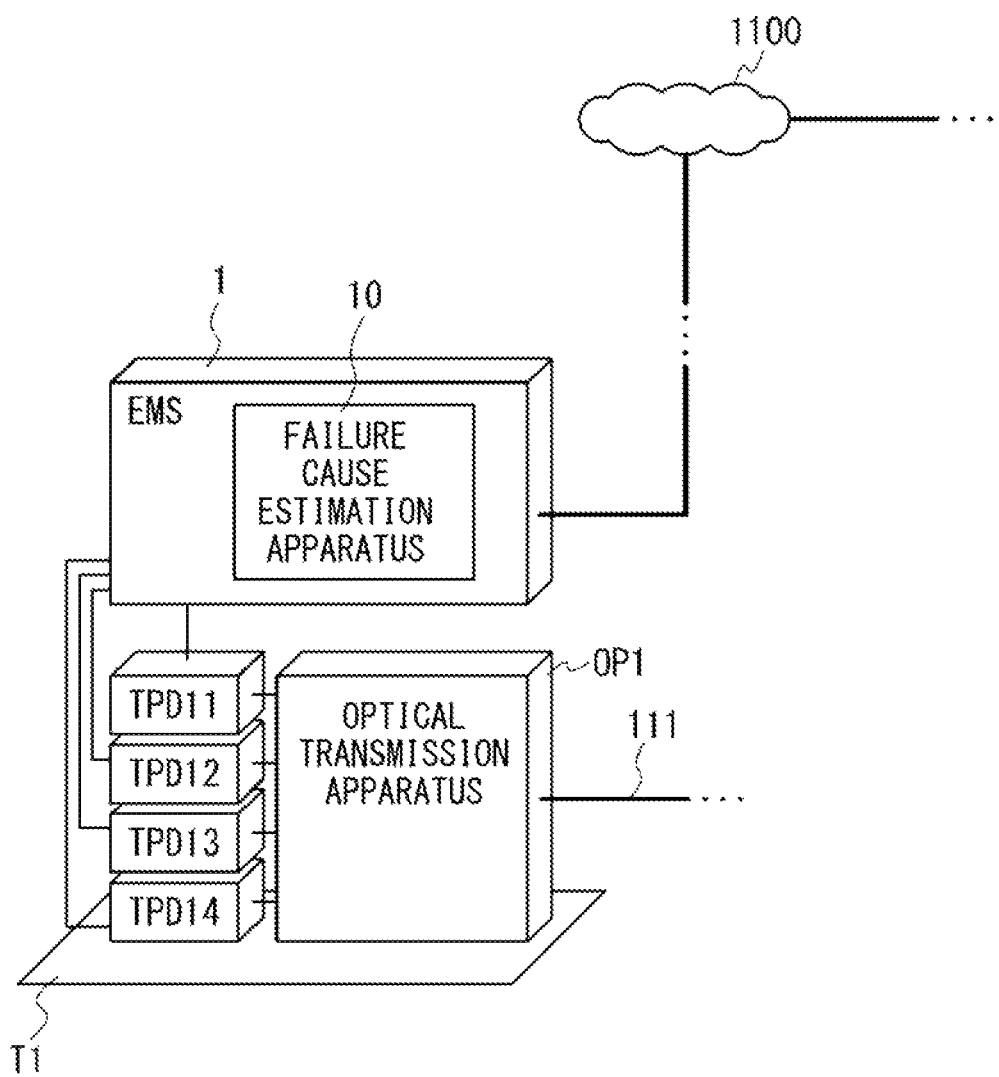
FIG. 4 is a diagram showing a first example of a location of a failure cause estimation apparatus.

First, a first example of a location of the failure cause estimation apparatus will be described. FIG. 4 shows the first example of the location of the failure cause estimation apparatus. In this example, an element management system (EMS) 1 for monitoring a state in the terminal station T1 is provided in a station building of the terminal station T1. The EMS 1 is connected to the network 1100.

In this example, the failure cause estimation apparatus 10 is incorporated in the EMS 1. The failure cause estimation apparatus 10 can output the failure cause estimation result ES1 via the network 1100 connected to the EMS 1.

According to the configuration of this example, since the failure cause estimation apparatus 10 can be introduced by using the equipment monitoring apparatus for monitoring the state in the station building, the failure cause analysis described in the first example embodiment can be realized without requiring any major change to the equipment in the station building.

Although the optical transmission apparatus OP1 and the EMS 1 are displayed separately in FIG. 4, the EMS 1 may be incorporated in the optical transmission apparatus OP1.

Figure 5:
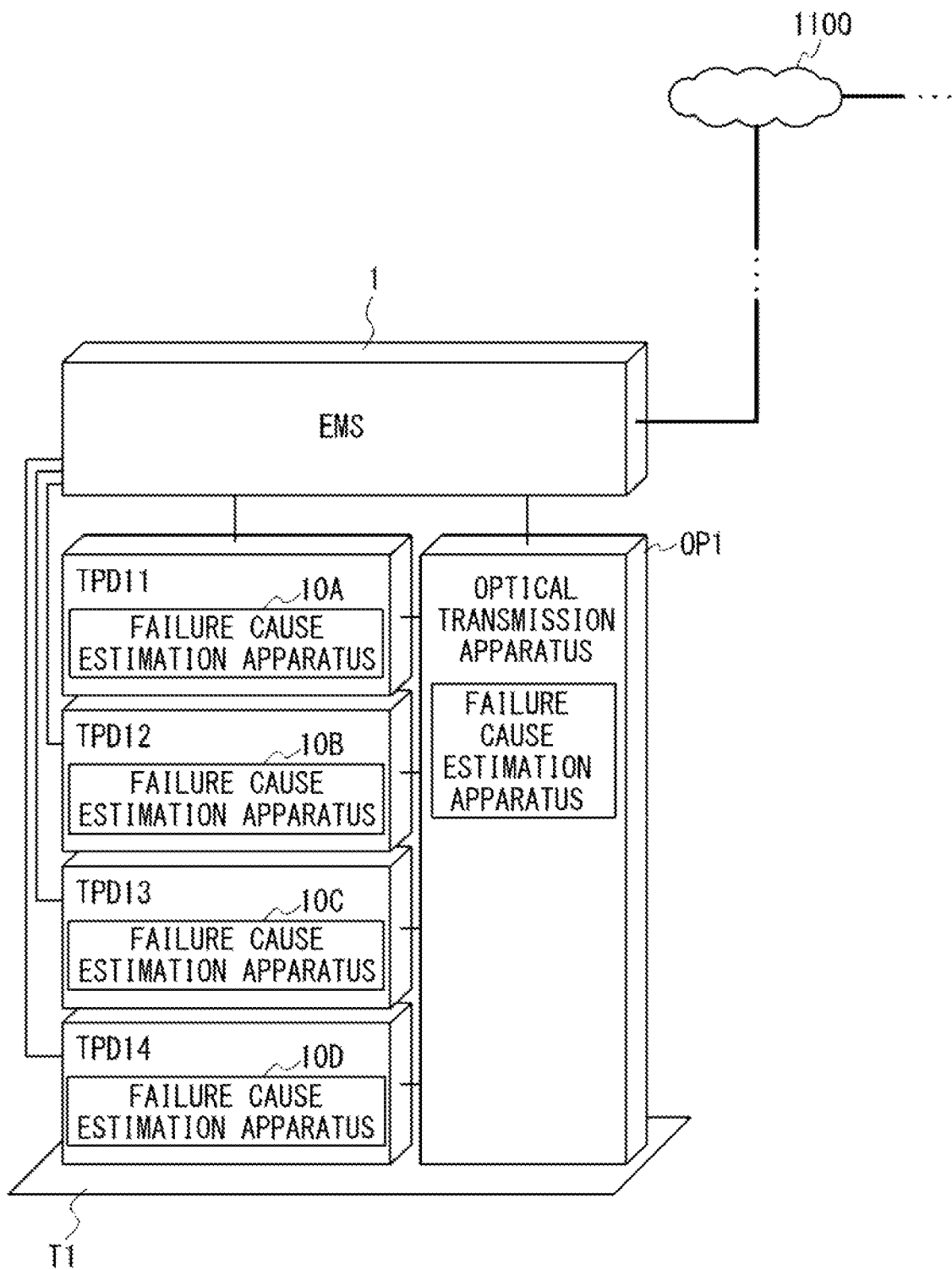
FIG. 5 is a diagram showing a second example of the location of the failure cause estimation apparatus.

Next, a second example of the location of the failure cause estimation apparatus will be described. FIG. 5 shows the second example of the location of the failure cause estimation apparatus. In this example, unlike the first example, as shown in FIG. 5, failure cause estimation apparatuses 10A to 10D similar to the failure cause estimation apparatuses 10 are incorporated in the transponders 11 to 14, respectively.

The failure cause estimation apparatuses 10A to 10D may be directly connected to the network 1100 or may be connected to the network 1100 via the EMS 1. Thus, the failure cause estimation result ES1 can be output via the network 1100.

According to the configuration of this example, since the equipment monitoring apparatus is incorporated in the transponder, the failure cause analysis described in the first example embodiment can be realized without requiring a major change to the equipment in the station building.

Although the terminal station T1 has been described above, it is needless to say that the failure cause estimation apparatus can be similarly disposed in the terminal station T2.

The arrangement of the failure cause estimation apparatus is not limited to the example described in the present example embodiment. That is, the failure cause estimation apparatus may be provided at any location in the station building, or may be provided outside the station building as necessary.

Third Example Embodiment

An optical communication system according to a third example embodiment will be described. In the optical communication system 1000 according to the first example embodiment, the failure analysis apparatus 100 is provided separately from the server 1200 and the NMS 1300. However, the location where the failure analysis apparatus is provided is not limited to this.

Figure 6:
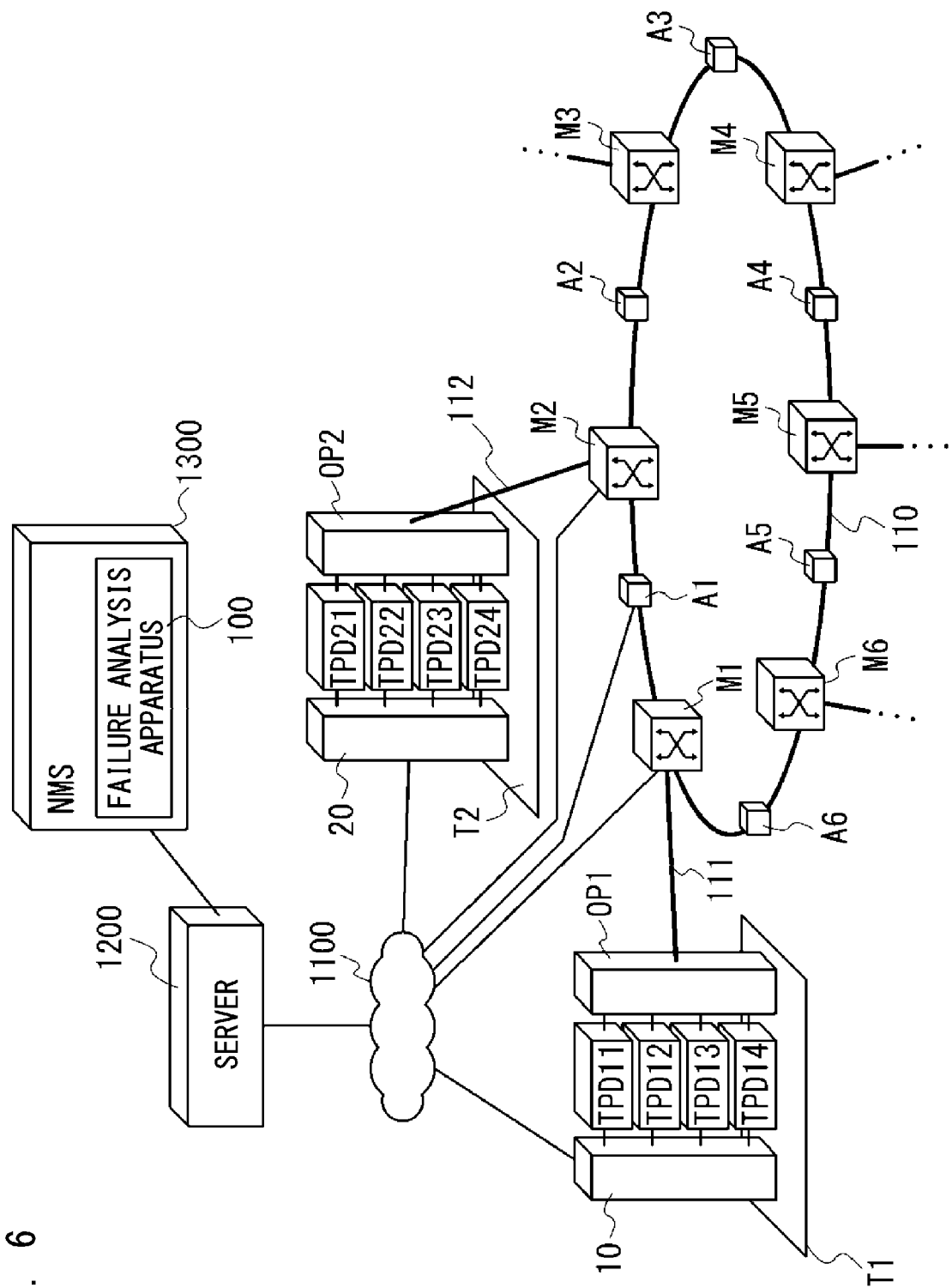
FIG. 6 shows a first example of a location of a failure analysis apparatus.

First, a first example of the location of the failure analysis apparatus will be described. FIG. 6 shows the first example of the location of the failure analysis apparatus. In this example, the failure analysis apparatus is incorporated in the NMS 1300. According to the configuration of this example, it is possible to reduce the load on the NMS by introducing the failure analysis apparatus, as compared with the case where the failure analysis is performed by the NMS in a general configuration in which the failure analysis apparatus does not exist.

Figure 7:
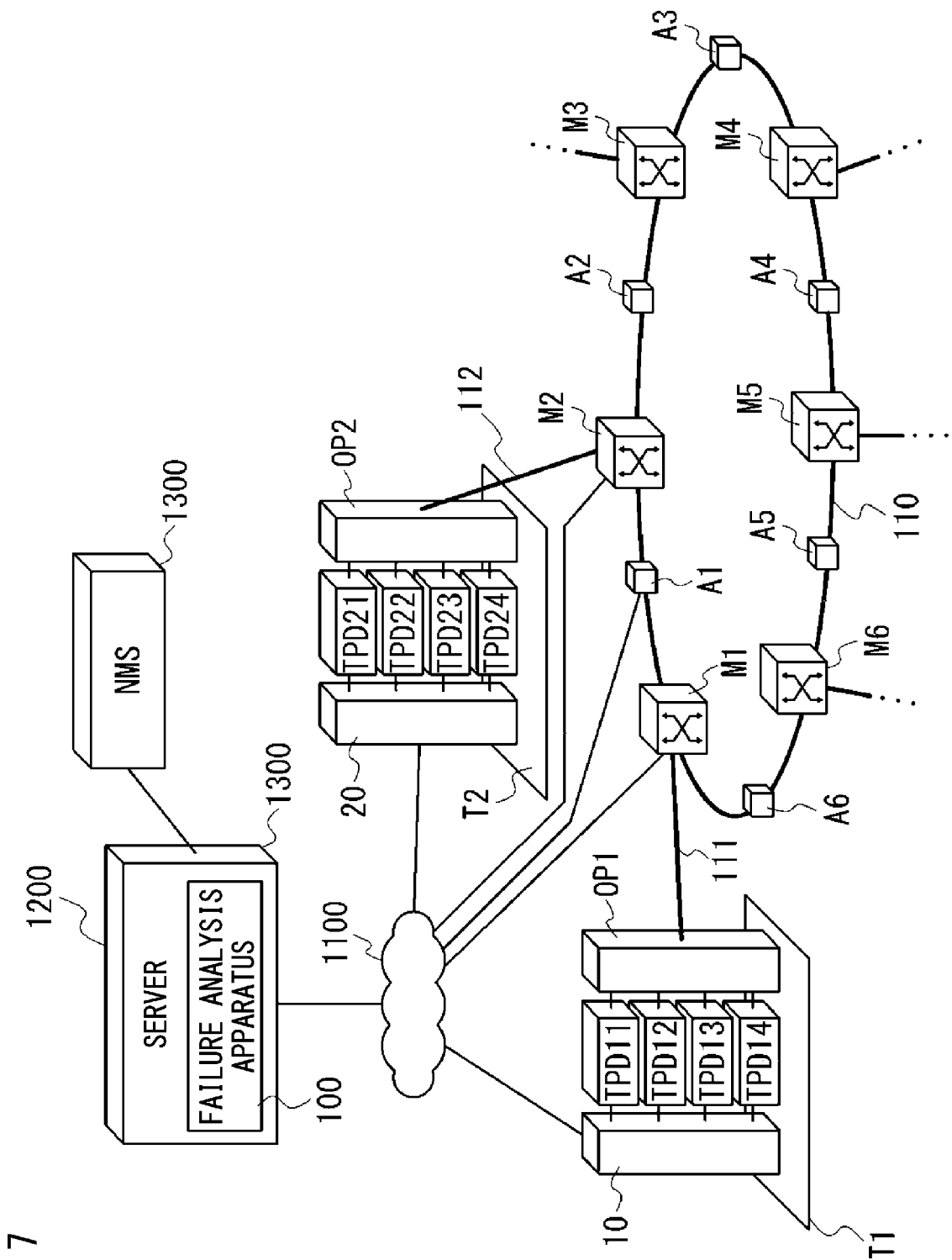
FIG. 7 shows a second example of the location of the failure analysis apparatus.

Next, a second example of the location of the failure analysis apparatus will be described. FIG. 7 shows the second example of the location of the failure analysis apparatus. In this example, a failure analysis apparatus is incorporated in the server 1200. According to the configuration of this example, it is possible to reduce the load on the NMS by introducing the failure analysis apparatus, as compared with the case where the failure analysis is performed by the NMS in the general configuration in which the failure analysis apparatus does not exist.

According to the configuration of the first and second examples, since the failure analysis apparatus 100 does not need to be provided separately from the server 1200 or the NMS 1300, it is possible to suppress the scale of necessary hardware.

Although in the present embodiment, the failure analysis apparatus 100 has been described as being incorporated into the server 1200 or the NMS 1300, it is needless to say that the failure analysis apparatus 100 may be incorporated into any other apparatuses in the upper layer.

Other Example Embodiments

The present invention is not limited to the above-described example embodiments, and can be modified as appropriate without departing from the scope of the invention. For example, in the above-described example embodiments, although the example in which the terminal station is connected to the optical transmission line that is a branch path branched from the ring-shaped optical transmission line 110 by the optical add/drop apparatus has been described, the terminal station may be connected to a path that does not go through the branch path, for example, a trunk path, if necessary.

Although the configuration having the ring-shaped optical transmission line 110 has been described in the above-described example embodiments, the optical transmission line constituting the optical communication system may be any network configuration.

Although the configuration having two terminal stations, six optical add/drop apparatuses, and six optical amplifiers has been described in the above-described example embodiments, the respective numbers of the terminal stations, the optical add/drop apparatuses, and the optical amplifiers are not limited to this example.

Although the example in which four transponders are provided in each terminal station has been described in the above-described example embodiments, the number of transponders provided in each terminal station is not limited to this example.

The present invention is not limited to the above-described example embodiments, and can be modified as appropriate without departing from the scope of the invention.

While the present invention has been described above with reference to exemplary embodiments, the present invention is not limited to the exemplary embodiments stated above.

(Supplementary note 1) An optical communication system including: an optical transmission line constituting an optical network; a plurality of terminal stations including one or more transponders and configured to communicate via the optical transmission line; failure probability estimation apparatuses respectively configured to monitor a state of the one or more transponders provided in each of the plurality of terminal stations and to estimate a failure probability for each location where an occurrence of a failure is suspected; a failure analysis apparatus configured to estimate a location where there is a risk of failure occurrence and a failure probability at the location where there is the risk of failure occurrence based on failure probability estimation results of the failure probability estimation apparatuses provided in the plurality of terminal stations.

(Supplementary note 2) The optical communication system according to Supplementary note 1, further including: one or more communication nodes inserted into the optical transmission line, in which the one or more communication nodes are configured to be capable of outputting information indicating a communication failure to the failure analysis apparatus, and the failure analysis apparatus estimates a location where the failure has occurred based on the location where there is the risk of failure occurrence relating to the communication failure and the failure probability at the location where there is the risk of failure occurrence according to the received information indicating the communication failure.

(Supplementary note 3) The optical communication system according to Supplementary note 2, in which the one or more communication nodes include: one or more optical amplifiers inserted into the optical transmission line; and one or more optical add/drop apparatuses inserted into the optical transmission line, and a part or all of the terminal stations communicates via the optical add/drop apparatus.

(Supplementary note 4) The optical communication system according to Supplementary note 2 or 3, in which the failure analysis apparatus requests the output of the failure probability estimation results to the part or all of the plurality of terminal stations when detecting the communication failure based on the received information indicating the communication failure, and the terminal station receiving the request outputs the failure probability estimation result to the failure analysis apparatus.

(Supplementary note 5) The optical communication system according to any one of Supplementary notes 1 to 4, in which the failure probability estimation apparatus of each terminal station continuously monitors the one or more transponders provided in each terminal station, and outputs the failure probability estimation result to the failure analysis apparatus when detecting the communication.

(Supplementary note 6) The optical communication system according to any one of Supplementary notes 1 to 5, in which the failure probability estimation apparatus of each terminal station continuously monitors the one or more transponders provided in each terminal station, and periodically updates the failure probability estimation result.

(Supplementary note 7) The optical communication system according to Supplementary note 6, in which the failure analysis apparatus estimates a location where the risk of failure occurrence is high based on the location where there is the risk of failure occurrence and the failure probability at the location where there is the risk of failure occurrence.

(Supplementary note 8) The optical communication system according to any one of Supplementary notes 1 to 7, in which the failure analysis apparatus outputs information for recovering the failure with the result of the estimation of the location where there is the risk of failure occurrence for each estimated location where there is the risk of failure occurrence.

(Supplementary Note 9) A failure analysis apparatus configured to monitor a state of one or more transponders provided in each of a plurality of terminal stations communicating through an optical transmission line constituting an optical network and to estimate a location where there is a risk of failure occurrence and a failure probability at the location where there is the risk of failure occurrence based on a failure probability estimation result of output from a failure probability estimation apparatus that estimates a failure probability at each location an occurrence of a failure is suspected.

(Supplementary note 10) The failure analysis apparatus according to Supplementary note 9, in which a location where the failure has occurred is estimated based on the location where there is the risk of failure occurrence relating to a communication failure and the failure probability at the location where there is the risk of failure occurrence according to information indicating the communication failure and received from one or more communication nodes that are configured to be capable of outputting the information indicating the communication failure.

(Supplementary note 11) The failure analysis apparatus according to Supplementary note 10, in which the one or more communication nodes include: one or more optical amplifiers inserted into the optical transmission line; and one or more optical add/drop apparatuses inserted into the optical transmission line, and a part or all of the terminal stations communicates via the optical add/drop apparatus.

(Supplementary note 12) The failure analysis apparatus according to Supplementary note 10 or 11, in which the failure analysis apparatus requests the output of the failure probability estimation results to the part or all of the plurality of terminal stations when detecting the communication failure based on the received information indicating the communication failure, and the terminal station receiving the request outputs the failure probability estimation result to the failure analysis apparatus.

(Supplementary note 13) The failure analysis apparatus according to any one of Supplementary note Supplementary notes 9 to 12, in which the failure probability estimation apparatus of each terminal station continuously monitors the one or more transponders provided in each terminal station, and outputs the failure probability estimation result to the failure analysis apparatus when detecting the communication.

(Supplementary note 14) The failure analysis apparatus according to any one of Supplementary notes 9 to 13, in which the failure probability estimation apparatus of each terminal station continuously monitors the one or more transponders provided in each terminal station, and periodically updates the failure probability estimation result.

(Supplementary note 15) The failure analysis apparatus according to Supplementary note 13, in which a location where the risk of failure occurrence is high is estimated based on the location where there is the risk of failure occurrence and the failure probability at the location where there is the risk of failure occurrence.

(Supplementary note 16) The failure analysis apparatus according to any one of Supplementary notes 9 to 15, in which information for recovering the failure is output with the result of the estimation of the location where there is the risk of failure occurrence for each estimated location where there is the risk of failure occurrence.

(Supplementary note 17) A failure probability estimation apparatus configured to monitor a state of one or more transponders provided in each of a plurality of terminal stations that communicate via an optical transmission line that constitutes an optical network, and estimate a failure probability for each location where an occurrence of a failure is suspected, and to output a failure probability estimation result to a failure analysis apparatus that estimates a location where there is a risk of failure occurrence and a failure probability at the location where there is the risk of failure occurrence based on the failure probability estimation results of the plurality of terminal stations.

(Supplementary note 18) A failure analysis method of optical communication system including: monitoring a state of one or more transponders provided in each of a plurality of terminal stations that communicate via an optical transmission line that constitutes an optical network, and estimate a failure probability for each location where an occurrence of a failure is suspected; and estimating a location where there is a risk of failure occurrence and a failure probability at the location where there is the risk of failure occurrence based on failure probability estimation results of the failure probability estimation apparatuses.

REFERENCE SIGNS LIST

11 TO 14, 21 TO 24 TRANSPONDERS
1 EMS
10, 20 FAILURE CAUSE ESTIMATION APPARATUSES
100 FAILURE ANALYSIS APPARATUS
110 TO 112 OPTICAL TRANSMISSION LINES
1000 OPTICAL COMMUNICATION SYSTEM
1100 NETWORK
1200 SERVER
1300 NMS
OP1, OP2 OPTICAL TRANSMISSION APPARATUSES
A1 TO A6 OPTICAL AMPLIFIERS
ES1, ES2 FAILURE CAUSE ESTIMATION RESULTS
M1 TO M1 OPTICAL ADD/DROP APPARATUSES
T1, T2 TERMINAL STATIONS

What is claimed is:

1. An optical communication system comprising:
an optical transmission line constituting an optical network;
a plurality of terminal stations comprising one or more transponders and configured to communicate via the optical transmission line;
a plurality of failure cause estimators respectively provided in and corresponding to the plurality of terminal stations, wherein each failure cause estimator is configured to
monitor a state of the one or more transponders in a corresponding terminal station, and
estimate a failure probability for each candidate location where a suspected failure occurrence; and
a failure analyzer configured to estimate a location where there is a failure risk occurrence and a failure probability at the location, based on failure probability estimation results of the plurality of failure cause estimators.

2. The optical communication system according to claim 1, further comprising one or more communication nodes inserted into the optical transmission line, wherein
the one or more communication nodes are configured to output information indicating a communication failure to the failure analyzer-, and
the failure analyzer the location based on the location where there is the failure risk occurrence which relates to the communication failure and the failure probability at the location.

3. The optical communication system according to claim 2, wherein
the one or more communication nodes include:
one or more optical amplifiers inserted into the optical transmission line; and
one or more optical add/drop apparatuses inserted into the optical transmission line, and
a part or all of the terminal stations communicate via the one or more optical add/drop apparatuses.

4. The optical communication system according to claim 2, wherein
the failure analyzer requests the failure probability estimation results to a part or all of the plurality of terminal stations, and
each terminal station receiving the request outputs a corresponding failure probability estimation result to the failure analyzer.

5. The optical communication system according to claim 1, wherein the failure cause estimator of each terminal station continuously monitors the one or more transponders provided therein, and outputs a corresponding failure probability estimation result to the failure analyzer.

6. The optical communication system according to claim 1, wherein the failure cause estimator of each terminal station continuously monitors the one or more transponders provided therein, and periodically updates a corresponding failure probability estimation result.

7. The optical communication system according to claim 6, wherein the failure analyzer estimates the location as high based on the failure probability at the location.

8. The optical communication system according to claim 1, wherein the failure analyzer outputs information for recovering from failure with a location estimation result.

9. A failure analyzer for an optical communication system,
wherein the optical communication system comprises:
an optical transmission line constituting an optical network;
a plurality of terminal stations comprising one or more transponders and configured to communicate via the optical transmission line; and
a plurality of failure cause estimators respectively provided in and corresponding to the plurality of terminal stations, wherein each failure cause estimator is configured to
monitor a state of the one or more transponders in a corresponding terminal station, and
estimate a failure probability for each candidate location where a suspected failure occurrence,
wherein the failure analyzer configured to estimate a location where there is a failure risk occurrence and a failure probability at the location, based on failure probability estimation results of the plurality of failure cause estimators.

10. The failure analyzer according to claim 9, wherein the optical communication system further comprises one or more communication nodes inserted into the optical transmission line and configured to output information indicating a communication failure to the failure analyzer, and
the failure analyzer estimates the location based on the location where there is the failure risk occurrence which relates to the communication failure and the failure probability at the location.

11. The failure analyzer according to claim 10,
the one or more communication nodes include:
one or more optical amplifiers inserted into the optical transmission line; and
one or more optical add/drop apparatuses inserted into the optical transmission line, and
a part or all of the terminal stations communicate via the one or more optical add/drop apparatuses.

12. The failure analyzer according to claim 10, wherein
the failure analyzer requests the failure probability estimation results to a part or all of the plurality of terminal stations, and
each terminal station receiving the request outputs a corresponding failure probability estimation result to the failure analyzer.

13. The failure analyzer according to claim 9, wherein the failure cause estimator of each terminal station continuously monitors the one or more transponders provided therein, and outputs a corresponding failure probability estimation result to the failure analyzer.

14. The failure analyzer according to claim 9, wherein the failure cause estimator of each terminal station continuously monitors the one or more transponders provided therein, and periodically updates a corresponding failure probability estimation result.

15. The failure analyzer according to claim 14, wherein the failure analyzer estimates the location as high based on the failure probability at the location.

16. The failure analyzer according to claim 9, wherein the failure analyzer outputs information for recovering from failure with a location estimation result.

17. A failure analysis method for an optical communication system,
wherein the optical communication system comprises:
an optical transmission line constituting an optical network;
a plurality of terminal stations comprising one or more transponders and configured to communicate via the optical transmission line;
a plurality of failure cause estimators respectively provided in and corresponding to the plurality of terminal stations; and
a failure analyzer
wherein the failure analysis method comprises, by each failure cause estimator:
monitoring a state of the one or more transponders in a corresponding terminal station; and
estimating a failure probability for each candidate location where a suspected failure occurrence, and
wherein the failure analysis method further comprises, by the failure analyzer, estimating a location where there is a failure risk occurrence and a failure probability at the location, based on failure probability estimation results of the plurality of failure cause estimators.

* * * * *